(12) United States Patent
Elgaafary

(10) Patent No.: US 11,831,640 B2
(45) Date of Patent: *Nov. 28, 2023

(54) VERIFYING IDENTITY OF A SOURCE OF A TRANSMISSION

(71) Applicant: UAB 360 IT, Vilnius (LT)

(72) Inventor: Mohamed Adly Amer Elgaafary, Vilnius (LT)

(73) Assignee: UAB 360 IT, Vilnius (LT)

( * ) Notice: Subject to any disclaimer, the term of this patent is extended or adjusted under 35 U.S.C. 154(b) by 0 days.

This patent is subject to a terminal disclaimer.

(21) Appl. No.: 17/721,309

(22) Filed: Apr. 14, 2022

(65) Prior Publication Data

US 2023/0336546 A1 Oct. 19, 2023

Related U.S. Application Data

(63) Continuation of application No. 17/719,640, filed on Apr. 13, 2022.

(51) Int. Cl.
*H04L 29/00* (2006.01)
*H04L 9/40* (2022.01)
*G06F 16/435* (2019.01)
*G06V 40/12* (2022.01)

(52) U.S. Cl.
CPC ........ *H04L 63/0861* (2013.01); *G06F 16/436* (2019.01); *G06V 40/12* (2022.01)

(58) Field of Classification Search
CPC .... H04L 63/0861; G06F 16/436; G06V 40/12
See application file for complete search history.

(56) References Cited

U.S. PATENT DOCUMENTS

| | | | |
|---|---|---|---|
| 8,103,875 B1* | 1/2012 | Ramzan | H04L 63/0236 713/180 |
| 9,282,109 B1 | 3/2016 | Aziz et al. | |
| 9,537,813 B2 | 1/2017 | Schmid | |
| 10,073,971 B2 | 9/2018 | Jain | |
| 10,491,627 B1 | 11/2019 | Su | |
| 2003/0004842 A1 | 1/2003 | Williams et al. | |
| 2012/0131647 A1* | 5/2012 | Lan | H04L 67/02 726/4 |
| 2018/0331886 A1* | 11/2018 | Schroeder | H04L 69/40 |
| 2020/0067930 A1* | 2/2020 | Goeringer | H04L 63/0236 |
| 2020/0120144 A1* | 4/2020 | Yadav | G06Q 20/4016 |
| 2020/0342074 A1 | 10/2020 | Nethery | |
| 2020/0342108 A1* | 10/2020 | Ford | G06F 21/57 |
| 2021/0185083 A1 | 6/2021 | Azaria et al. | |

* cited by examiner

*Primary Examiner* — Ghazal B Shehni
(74) *Attorney, Agent, or Firm* — The Pattani Law Group

(57) ABSTRACT

A method including storing, by a device in a database, a trusted fingerprint determined based at least in part on encrypting trusted connection information included in a trusted transmission packet received from a trusted source application; determining, by the device, a current fingerprint based at least in part on encrypting current connection information included in a current transmission packet received from a current source application; comparing, by the device, the current fingerprint with the trusted fingerprint; and processing, by the device, the current transmission packet based at least in part on a result of comparing the current fingerprint with the trusted fingerprint. Various other aspects are contemplated.

20 Claims, 6 Drawing Sheets

VERIFYING IDENTITY OF A SOURCE OF A TRANSMISSION

CROSS REFERENCE

This application is a continuation of U.S. Non-Provisional patent application Ser. No. 17/719,640, filed on Apr. 13, 2022, 2022, and titled "Verifying Identity Of A Source Of A Transmission," the entire contents of which are incorporated herein by reference.

FIELD OF DISCLOSURE

Aspects of the present disclosure generally relate to cyber security, and more particularly to verifying identity of a source of a transmission to mitigate the risks associated with cybercrimes.

BACKGROUND

A user device may rely on a network to communicate information and/or to communicate messages with another user device. Such information and/or messages may include private information and/or sensitive data associated with the user device. The communication over the network may be vulnerable as being susceptible to a cybercrime, through which a malicious entity may attempt to steal, alter, disable, expose, or destroy the information through unauthorized access to the communicating user devices. A cybercrime may include, for example, a malware attack, a phishing attack, a ransomware attack, a virus attack, etc. As a result, cyber security measures may be used to prevent occurrence of the cybercrime and/or to mitigate risks associated with the cybercrime.

SUMMARY

In one aspect, the present disclosure contemplates a method including receiving, by a device from a transmitting source application, a transmission packet to be transmitted to a destination application; determining, by the device, connection information included in the transmission packet, the connection information indicating one or more parameters to be utilized by the destination application to connect with the transmitting source application; determining, by the device, a fingerprint associated with the connection information based at least in part on encrypting the one or more parameters; comparing, by the device, the determined fingerprint with a fingerprint stored in correlation with an identity of a trusted source application; and processing, by the device, the transmission packet based at least in part on a result of comparing the determined fingerprint with the stored fingerprint.

In another aspect, the present disclosure contemplates a security device including a memory and a processor communicatively coupled to the memory, the memory and the processor being configured to: receive, from a transmitting source application, a transmission packet to be transmitted to a destination application; determine connection information included in the transmission packet, the connection information indicating one or more parameters to be utilized by the destination application to connect with the transmitting source application; determine a fingerprint associated with the connection information based at least in part on encrypting the connection information; compare the determined fingerprint with a stored fingerprint stored in correlation with an identity of a trusted source application; and process the transmission packet based at least in part on a result of comparing the determined fingerprint with the stored fingerprint.

In another aspect, the present disclosure contemplates a non-transitory computer readable medium storing instructions, which when executed by a processor associated with a security device, cause the processor to: receive, from a transmitting source application, a transmission packet to be transmitted to a destination application; determine connection information included in the transmission packet, the connection information indicating one or more parameters to be utilized by the destination application to connect with the transmitting source application; determine a fingerprint associated with the connection information based at least in part on encrypting the connection information; compare the determined fingerprint with a stored fingerprint stored in correlation with an identity of a trusted source application; and process the transmission packet based at least in part on a result of comparing the determined fingerprint with the stored fingerprint.

It is to be understood that both the foregoing general description and the following detailed description are exemplary and explanatory in nature and are intended to provide an understanding of the present disclosure without limiting the scope thereof. In that regard, additional aspects, features, and advantages of the present disclosure will be apparent to one skilled in the art from the following detailed description.

BRIEF DESCRIPTION OF THE DRAWINGS

The accompanying drawings illustrate aspects of systems, devices, methods, and/or mediums disclosed herein and together with the description, serve to explain the principles of the present disclosure. Throughout this description, like elements, in whatever aspect described, refer to common elements wherever referred to and referenced by the same reference number. The characteristics, attributes, functions, interrelations ascribed to a particular element in one location apply to those elements when referred to by the same reference number in another location unless specifically stated otherwise.

The figures referenced below are drawn for ease of explanation of the basic teachings of the present disclosure; the extensions of the figures with respect to number, position, relationship, and dimensions of the parts to form the following aspects may be explained or may be within the skill of the art after the following description has been read and understood. Further, exact dimensions and dimensional proportions to conform to specific force, weight, strength, and similar requirements will likewise be within the skill of the art after the following description has been read and understood.

The following is a brief description of each figure used to describe the present disclosure, and thus, is being presented for illustrative purposes only and should not be limitative of the scope of the present disclosure.

Figure 1:
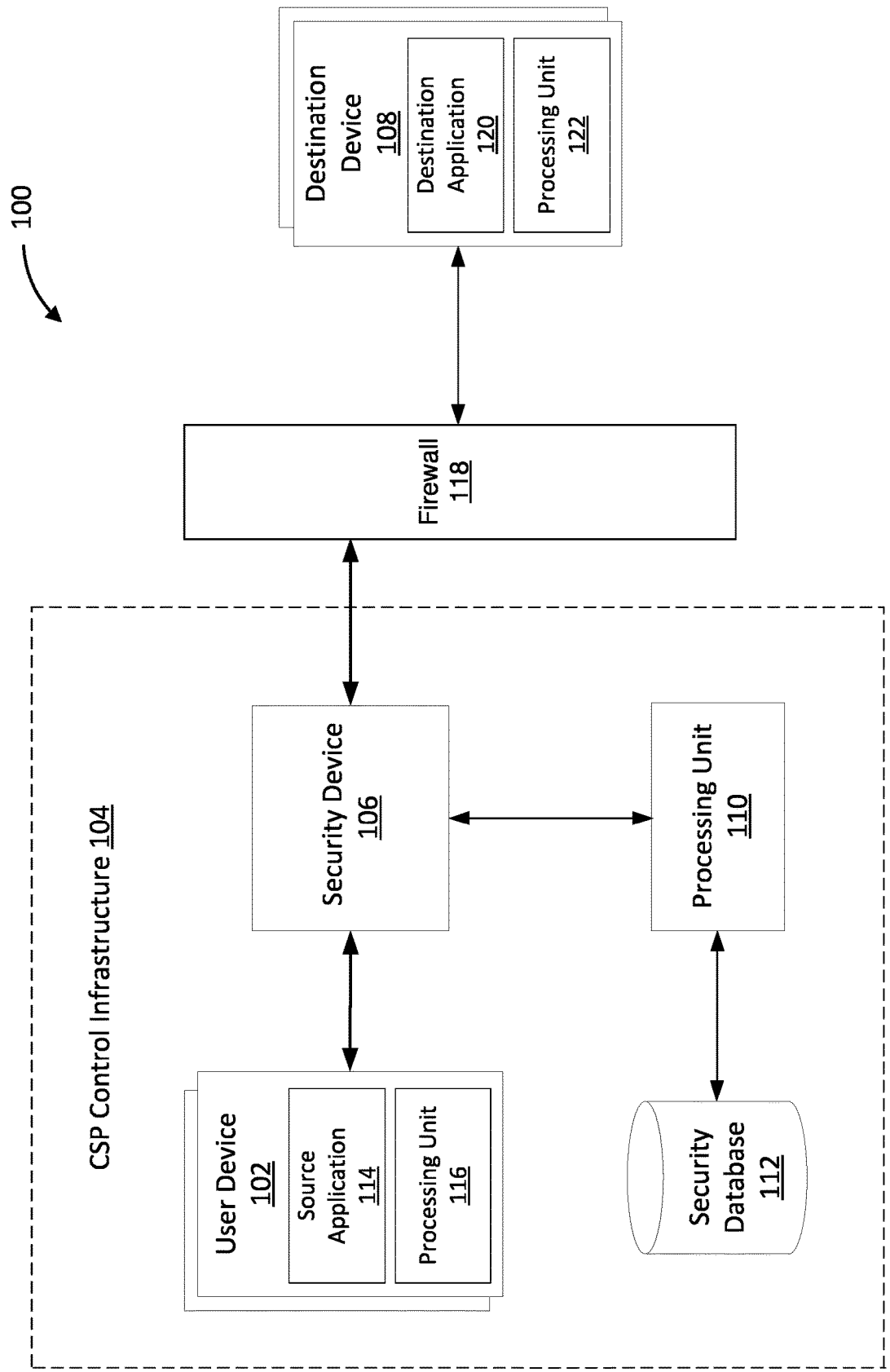

FIG. 1 is an illustration of an example system associated with verifying identity of a source of a transmission, according to various aspects of the present disclosure.

Figure 2:
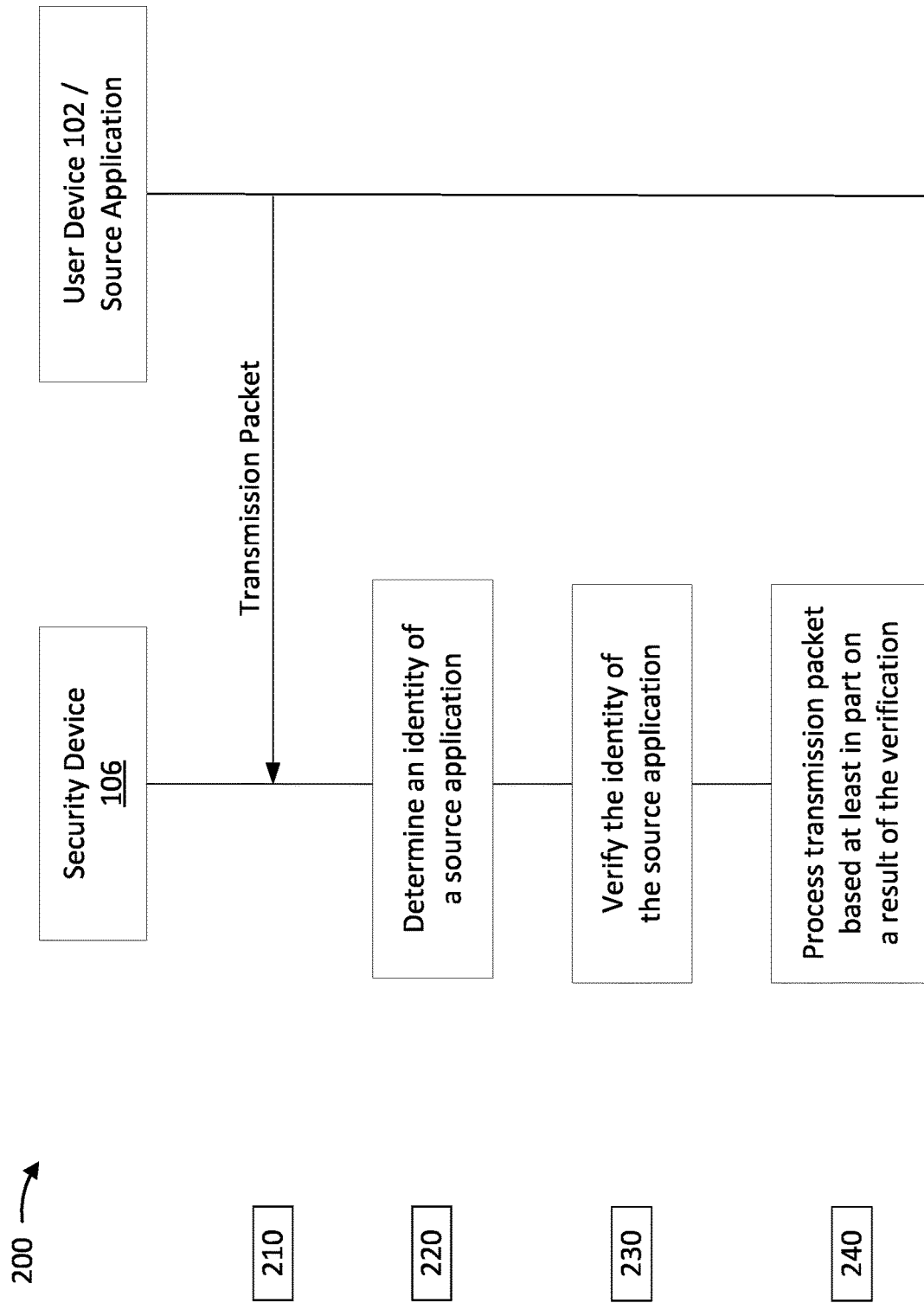

FIG. 2 is an illustration of an example flow associated with verifying identity of a source of a transmission, according to various aspects of the present disclosure.

Figure 3:
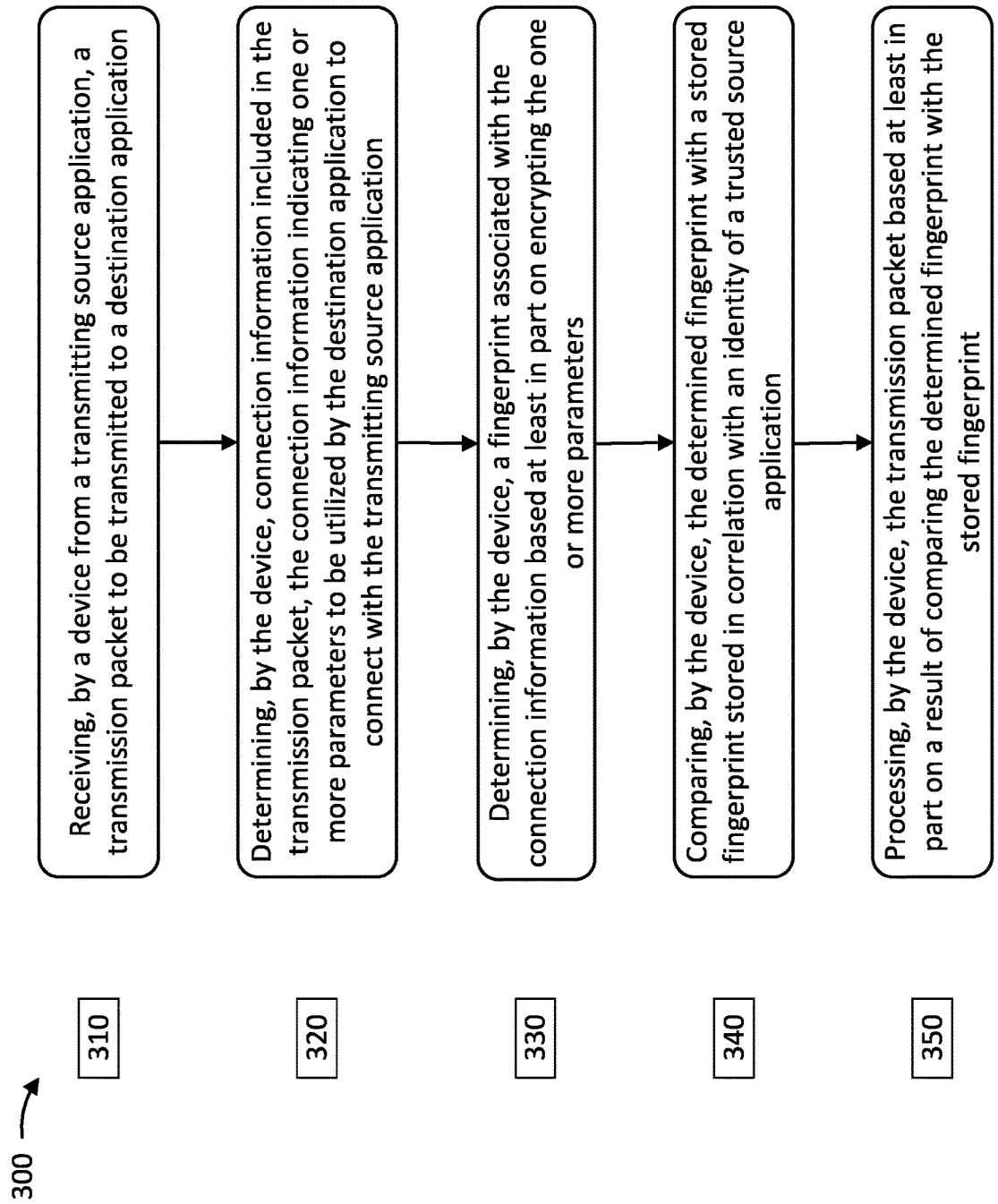

FIG. 3 is an illustration of an example process associated with verifying identity of a source of a transmission, according to various aspects of the present disclosure.

Figure 4:
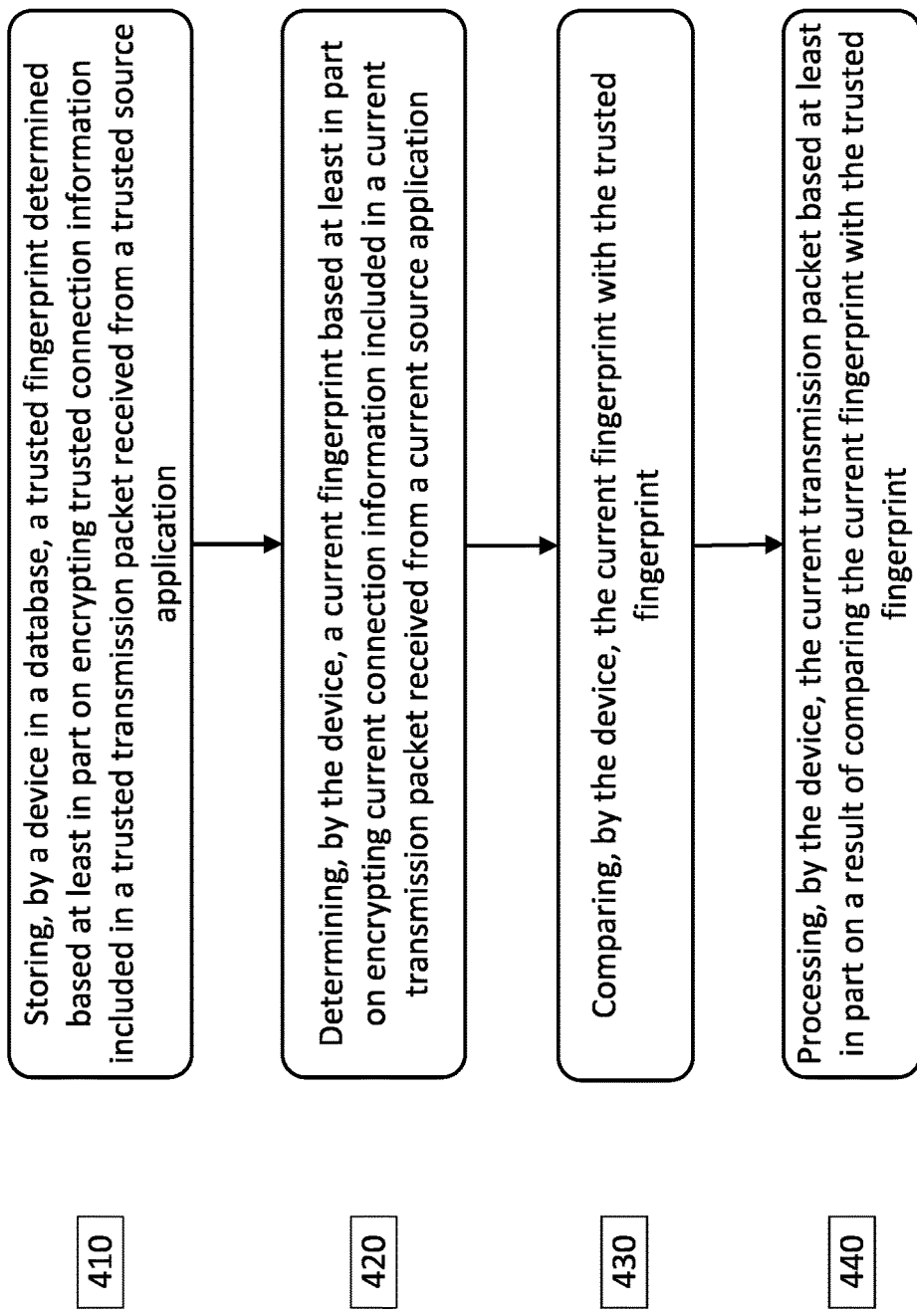

FIG. 4 is an illustration of an example process associated with verifying identity of a source of a transmission, according to various aspects of the present disclosure.

Figure 5:
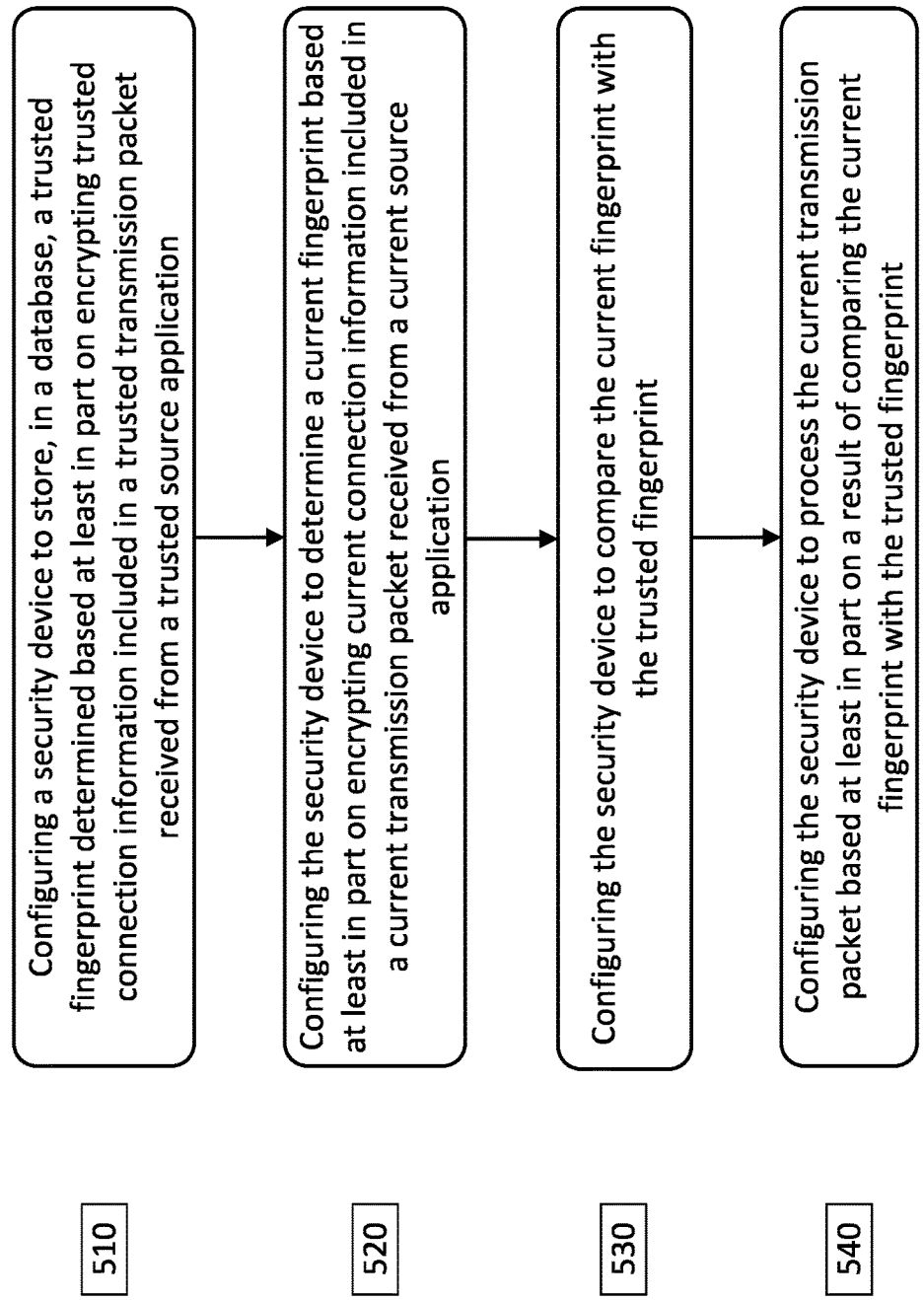

FIG. 5 is an illustration of an example process associated with verifying identity of a source of a transmission, according to various aspects of the present disclosure.

Figure 6:
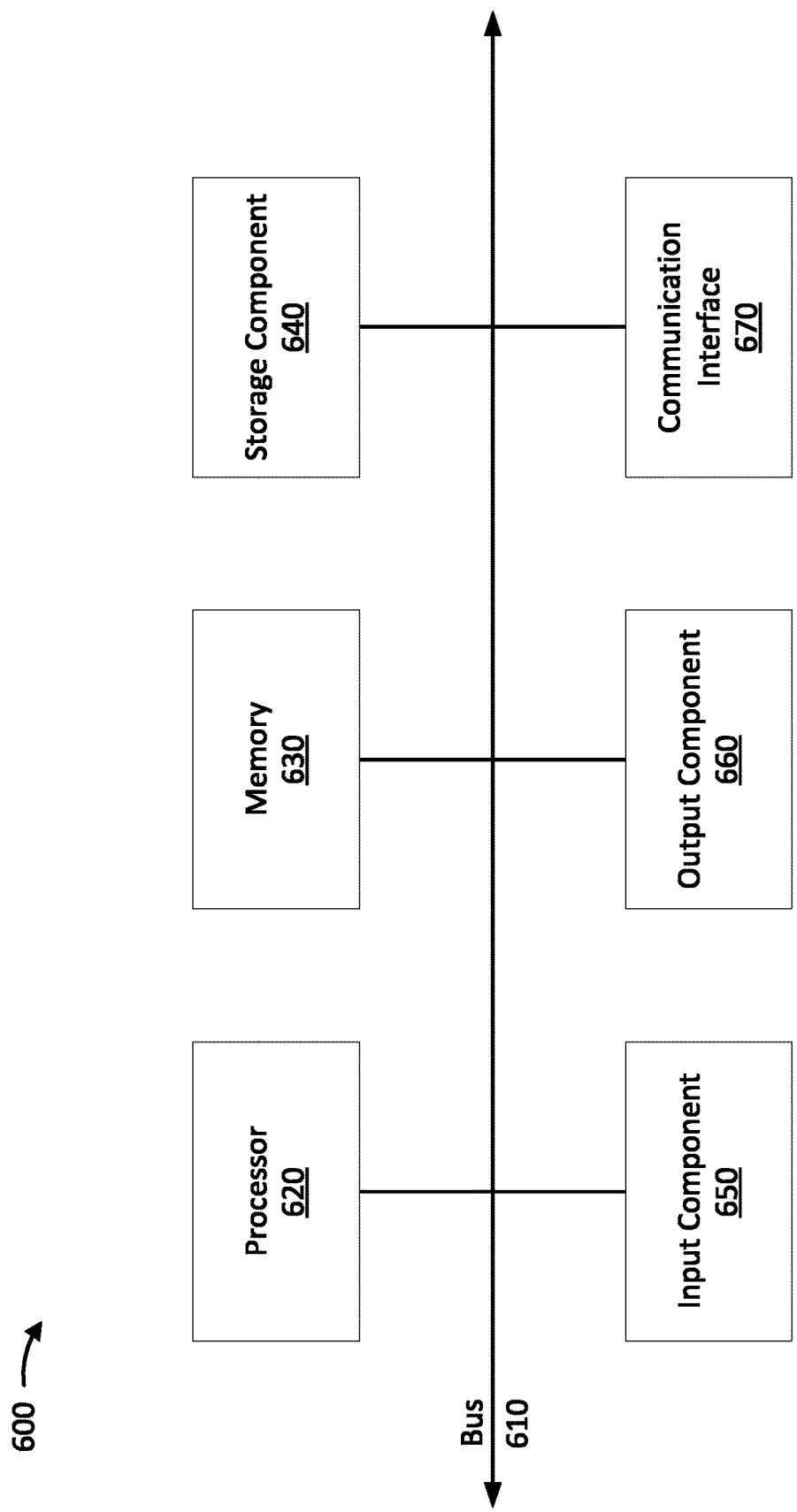

FIG. 6 is an illustration of example devices associated with verifying identity of a source of a transmission, according to various aspects of the present disclosure.

DETAILED DESCRIPTION

For the purposes of promoting an understanding of the principles of the present disclosure, reference will now be made to the aspects illustrated in the drawings, and specific language may be used to describe the same. It will nevertheless be understood that no limitation of the scope of the disclosure is intended. Any alterations and further modifications to the described devices, instruments, methods, and any further application of the principles of the present disclosure are fully contemplated as would normally occur to one skilled in the art to which the disclosure relates. In particular, it is fully contemplated that the features, components, and/or steps described with respect to one aspect may be combined with the features, components, and/or steps described with respect to other aspects of the present disclosure. For the sake of brevity, however, the numerous iterations of these combinations may not be described separately. For simplicity, in some instances the same reference numbers are used throughout the drawings to refer to the same or like parts.

FIG. 1 is an illustration of an example 100 associated with verifying identity of a source of a transmission, according to various aspects of the present disclosure. Example 100 shows an architectural depiction of included components. In some aspects, the components may include one or more user devices 102 associated with and/or included within a cyber security service provider (CSP) control infrastructure 104 for purposes of obtaining cyber security services. The CSP control infrastructure 104 may include a secured device 106, a processing unit 110, and a security database 112. A user device may include a source application (e.g., communication application) 114 and a processing unit 116. The user device 102 and/or the CSP control infrastructure 104 may utilize a firewall 118 to communicate with a destination device 108 operating on the open Internet. The destination device 108 may include a destination application 120 and a processing unit 122.

In some aspects, the user device 102 may be referred to as a source device. The source application 114 may include an application utilized by the user device 102 to communicate (e.g., transmit and/or receive) information and/or messages over a network (e.g., Internet). In an example, the source application 114 may include one or more third-party applications such as, for example, a web browser application, an email application, a social network application, a messaging application, or the like. The CSP control infrastructure 104 may be owned and operated by a cyber security service provider. The security device 106 may be configured to receive data communicated by the user device 102 and may be communicatively coupled to the processing unit 110. Additionally, the processing unit 110 may be communicatively coupled to the security database 112, which may be capable of storing data associated with providing the cyber security services.

The user device 102 and/or the destination device 108 may be physical computing devices capable of hosting applications (e.g., source application 114, destination application 120, etc.) and of connecting to the network. The user device 102 and/or the destination device 108 may include, for example, a laptop, a mobile phone, a tablet computer, a desktop computer, a smart device, a router, or the like. In some aspects, the user device 102 and/or the destination device 108 may include, for example, Internet-of-Things (IoT) devices such as MSP smart home appliances, smart home security systems, autonomous vehicles, smart health monitors, smart factory equipment, wireless inventory trackers, biometric cyber security scanners, or the like. In some aspects, the user device 102 and/or the destination device 108 may include a server computer.

The network may be any wired or wireless digital telecommunication network that permits several nodes to share and access resources. In some aspects, the network may include a combination of one or more of, for example, a local-area network (LAN), a wide-area network (WAN), a campus-area network (CAN), a metropolitan-area network (MAN), a home-area network (HAN), Internet, Intranet, Extranet, and Internetwork.

The processing unit 110 may be a logical unit including a logical component configured to perform complex operations associated with computing, for example, numerical weights related to various factors associated with providing the cyber security services. The processing unit 110 included in the CSP control infrastructure 104 may be configured to determine the cyber security services to be provided to the user device 102.

The CSP control infrastructure 104 may include a combination of hardware and software components that enable provision of cyber security services to the user device 102. The CSP control infrastructure 104 may interface with (the communication application on) the user device 102 via an application programming interface (API) (not shown), which may include one or more endpoints to a defined request-response message system. In some aspects, the API may be configured to receive, via the network, a connection request from the user device 102 to establish a connection with the CSP control infrastructure 104 for purposes of obtaining the cyber security services. The connection request may include an authentication request to authenticate the user device 102 and/or to receive the cyber security services.

The API may further be configured to handle the connection request(s) by mediating the authentication request. For instance, the API may receive from the user device 102 credentials including, for example, a unique combination of a user ID and password for purposes of authenticating the user device 102. In another example, the credentials may include a unique validation code known to an authentic user. The API may provide the received credentials to the processing unit 110 for verification. The processing unit 110 may communicate with the security database 112 to authenticate the user device 102.

The security database 112 may include a structured repository of valid credentials belonging to authentic users. In one example, the structured repository may include one or more tables containing valid unique combinations of user IDs and passwords belonging to authentic users. In another example, the structured repository may include one or more tables containing valid unique validation codes associated with authentic users. The cyber security service provider may add or delete such valid unique combinations of user IDs and passwords from the structured repository at any time. Based at least in part on receiving the credentials from the API, the user database 108 and a processor (e.g., the processing unit 110 or another local or remote processor) may verify the received credentials by matching the received credentials with the valid credentials stored in the structured repository. In some aspects, the security database 112 and the processing unit 110 may authenticate the user device 102 when the received credentials match at least one of the valid credentials. In this case, the cyber security service provider may provide better security services to the user device 102. When the received credentials fail to match at least one of the valid credentials, the user database 108 and the processor may fail to authenticate the user device 102. In this case, the cyber security service provider may decline to provide cyber security services to the user device 102.

When the user device 102 is authenticated, the user device 102 may initiate a connection with the CSP control infrastructure 104 for obtaining the cyber security services. The processing unit 110 may utilize the API 106 to transmit information associated with the cyber security services to the user device 102.

One or more components (e.g., security device 106, processing unit 110, and/or security database 112, source application 114, processing unit 116) included in the CSP control infrastructure 104 and/or included in the user device 102, as shown in FIG. 1, may further be associated with a controller/processor, a memory, a communication interface, or a combination thereof (e.g., FIG. 6). For instance, the one or more components may include or may be included in a controller/processor, a memory, or a combination thereof. In some aspects, the one or more components included in the CSP control infrastructure 104 may be separate and distinct from each other. Alternatively, in some aspects, the one or more of the components included in the CSP control infrastructure 104 may be combined with one or more of the other components. In some aspects, the one or more of the components included in the CSP control infrastructure 104 and/or the user device 102 may be local with respect to each other. Alternatively, in some aspects, one or more of the components included in the CSP control infrastructure 104 and/or the user device 102 may be located remotely with respect to one or more of other components included in the CSP control infrastructure 104 and/or the user device 102. Additionally, or alternatively, one or more components of the components included in the CSP control infrastructure 104 and/or the user device 102 may be implemented at least in part as software stored in a memory for execution by a processor. For example, a component (or a portion of a component) may be implemented as instructions or code stored in a non-transitory computer-readable medium and executable by a controller or a processor to perform the functions or operations of the component. Additionally, the one or more components may be configured to perform one or more functions described as being performed by another set of components shown in FIG. 1.

As indicated above, FIG. 1 is provided as an example. Other examples may differ from what is described with regard to FIG. 1.

A CSP control infrastructure may provide cyber security services to an associated user device. Providing the cyber security services may include the CSP control infrastructure configuring a firewall to provide network security by monitoring and filtering data communicated (e.g., transmitted and/or received) by the user device over the open Internet. Configuring the firewall may include establishing the rules according to which the firewall may filter the data. The data may be communicated utilizing an internet protocol (IP) packet that indicates source information (e.g., source IP address, source port, etc.) associated with a source of the IP packet and destination information (e.g., destination IP address, destination port, etc.) associated with a destination of the IP packet. The firewall may be configured to allow communication of IP packets including specified source information and/or destination information.

For instance, the user device may transmit an IP packet via the firewall to a destination device on the open Internet. The firewall may be configured to allow transmission of the IP packet from the user device to the destination device based at least in part on specifying, in an established rule, the source information associated with the user device and the destination information associated with the destination device. In this case, upon receiving the IP packet, the firewall may allow transmission of the IP packet to the destination device based at least in part on the established rule.

In some cases, the network security provided by the firewall based on the established rule may be inadequate. For instance, a malicious party may gain unauthorized access to the user device and may install connection malware on the user device. In this case, when the user device transmits the IP packet to connect with the destination device, the firewall may allow transmission of the IP packet according to the established rule. Due to the connection malware, the IP packet may include malicious content, which when received by an external device (e.g., the destination device and/or another device) on the open Internet, may enable the malicious party to connect with and/or gain unauthorized access to the CSP control infrastructure.

In an example, the malicious party may install system malware on the devices associated with the CSP control infrastructure (including the user device). The system malware may be designed to disrupt and/or damage operation of the CSP control infrastructure. In an example, the system malware may embed itself within an operating system of the CSP control infrastructure and may execute an unauthorized transmission of private information stored in a database associated with the CSP control infrastructure. In another example, the system malware may execute an unauthorized deletion of data stored in the database. The system malware may also cause other hindrances by adversely affecting the operating system of the CSP control infrastructure such that the operating system may run slower and/or associated circuitry may emit excessive heat and/or noise, thereby causing damage to the devices associated with CSP control infrastructure.

In such cases, the CSP control infrastructure may expend various infrastructure resources (e.g., processing resources, memory resources, power consumption resources, battery life, or the like) in efforts to mitigate effects of the private information becoming compromised and the hindrances caused by the system malware. Similarly, the user device may expend various user device resources (e.g., processing resources, memory resources, power consumption resources, battery life, or the like) in efforts to mitigate effects of the private information becoming compromised and the hindrances caused by the system malware.

Various aspects of systems and techniques discussed in the present disclosure enable verifying identity of a source of a transmission. In some aspects, as shown in FIG. 1, a CSP control infrastructure may configure a security device to verify an identity of a source application, as discussed herein. In some aspects, an associated user device may utilize the source application to transmit an IP packet via a firewall to a destination device on the open Internet. The security device may receive the IP packet from the source application and may determine connection information included in the IP packet. In some aspects, the connection information may indicate one or more parameters to be used by the user device and the destination device to connect and/or communicate data. The security device may determine a fingerprint associated with the connection information. The security device may compare the determined fingerprint with stored fingerprints, stored in a database associated with the CSP control infrastructure. The stored fingerprints may be associated with trusted source applications that are known to be in a condition unaffected by malware (e.g., connection malware and/or system malware). When the result of the comparison indicates that the determined fingerprint matches a stored fingerprint, the security device may determine that the source application is unaffected by malware. In this way, the security device verifies the identity of the source application as being a trusted source application. In this case, the security device may forward the IP packet to the firewall. Alternatively, when the result of the comparison indicates that the determined fingerprint fails to match the stored fingerprint, the security device may determine that the source application is affected by malware and/or that the IP packet includes malicious content. In this way, the security device verifies the identity of the source application as being an affected source application. In this case, the security device may discard the IP packet without forwarding the IP packet to the firewall. In other words, the security device may avoid transmission of the IP packet, which includes the malicious content, via the firewall to an external device on the open Internet. In this way, the security device may prevent a malicious party from gaining unauthorized access to the CSP control infrastructure. As a result, the security device may mitigate effects of private information becoming compromised and/or other hindrances. Additionally, the security device may enable efficient utilization of infrastructure resources (e.g., processing resources, memory resources, power consumption resources, battery life, or the like) and/or user device resources (e.g., processing resources, memory resources, power consumption resources, battery life, or the like) for suitable tasks associated with providing the cyber security services.

In some aspects, a processor (e.g., processing unit 110, processor 620, etc.) may receive, from a transmitting source application, a transmission packet to be transmitted to a destination application; determine connection information included in the transmission packet, the connection information indicating one or more parameters to be utilized by the destination application to connect with the transmitting source application; determine a fingerprint associated with the connection information based at least in part on encrypting the connection information; compare the determined fingerprint with a stored fingerprint stored in correlation with an identity of a trusted source application; and process the transmission packet based at least in part on a result of comparing the determined fingerprint with the stored fingerprint.

FIG. 2 is an illustration of an example flow 200 associated with verifying identity of a source of a transmission, according to various aspects of the present disclosure. The example flow 200 may include a user device 102 in communication with a security device associated with a CSP control infrastructure 104 (e.g., FIG. 1). In some aspects, the user device 102 may be associated with and/or included within the CSP control infrastructure 104. The user device 102 may utilize a source application to communicate data via a firewall (e.g., firewall 118) with a destination device 108 on the open Internet. In some aspects, the user device 102 and the CSP control infrastructure 104 may communicate with each other over a network (e.g., Internet). As discussed elsewhere herein, the CSP control infrastructure 104 may enable the user device 102 to obtain cyber security services.

In some aspects, the user device 102 may install source applications to be utilized to communicate information and/or messages with destination devices 108 on the open Internet. The source applications may include third party applications such as, for example, email clients (e.g., Outlook application, Gmail application, etc.), web browsers (e.g., Firefox, Chrome, Internet Explorer, etc.), messaging clients (e.g., Slack, Facebook messenger, etc.), social media applications (e.g., Facebook, Instagram, etc.), or the like.

Although only one user device and only one security device are shown in FIG. 2, the present disclosure contemplates the system to include any number of user devices and security devices that operate in a similar and/or analogous manner as discussed herein.

In some aspects, the user device 102 may obtain cyber security services from the CSP control infrastructure 104. Providing the cyber security services may include the CSP control infrastructure 104 determining stored fingerprint information that is stored in, for example, the security database 112. The stored fingerprint information may include fingerprints associated with trusted source applications that are known to be in a condition unaffected by malware (e.g., connection malware and/or system malware). In some aspects, the CSP control infrastructure 104 may utilize the security device 106 to determine the stored fingerprint information based at least in part on hashing and/or encrypting connection information indicating one or more parameters associated with the trusted source applications.

In an example, during a reference period prior to providing the cyber security services, the security device 106 may receive one or more trusted transmission packets from one or more trusted source applications installed on the user device 102. Such one or more trusted transmission packets may include initial connection packets indicating connection information to be utilized to connect with and/or communicate data with the one or more trusted source applications. Based at least in part on receiving the one or more trusted transmission packets, the security device 106 may determine an identity of the one or more trusted source applications.

In some aspects, determining an identity of a source application may include determining information identifying a state of the source application. In an example, determining the identity of the source application may include determining information identifying the source application. As discussed herein, the identity of the source application may be utilized to determine a state of the source application as being affected by malware or being unaffected by malware.

For a given trusted transmission packet, the security device 106 may determine source information (e.g., source IP address, source port, etc.) associated with the user device 102. The security device 106 may utilize the source information to query a local Internet protocol (IP) table to determine a process identifier associated with a given trusted source application that transmitted the given transmission packet. Based at least in part on an association between the process identifier and the identity of the given trusted source application, the security device 106 may determine the identity of the given trusted source application.

In some aspects, the given transmission packet may include given trusted connection information to enable the destination application to connect and/or communicate with the given trusted source application. Based at least in part on receiving the given trusted transmission packet, the security device 106 may analyze the given transmission packet to determine the given trusted connection information. In some aspects, the given trusted connection information may indicate information associated with any combination of one or more parameters to be utilized by the given trusted source application and the destination application to connect and/or communicate with each other.

In an example, the one or more parameters may include a cipher suite, a compression method, an elliptic curve (EC), EC point format, a signature algorithm, a certificate timestamp, etc. The cipher suite may identify, for example, one or more encryption algorithms that the destination device may utilize to connect and/or communicate with the user device 102. In some aspects, the one or more encryption algorithms may include, for example, a key exchange algorithm, a bulk encryption algorithm, a message authentication code (MAC) algorithm, etc. The compression method may identify, for example, one or more transport layer security (TLS) compression methods that the destination device may utilize to connect and/or communicate with the user device 102. The elliptic curve may identify, for example, one or more cryptography schemes that are based on algebraic structures of elliptic curves and may be utilized by the destination device to connect and/or communicate with the user device 102. The EC point format may indicate cryptography keys that may be determined based at least in part on pairs of integer coordinates laying on an elliptic curve and may be utilized by the destination device to connect and/or communicate with the user device 102. The signature algorithm may identify, for example, one or more cryptography algorithms that the destination device may utilize to sign messages transmitted by the destination device to the user device 102. The certificate timestamp may identify, for example, one or more types of certificate timestamps to be signed and transmitted by the destination device while connecting and/or communicating with the user device 102.

Based at least in part on determining the given trusted connection information, the security device 106 may determine a given trusted fingerprint associated with the given trusted source application. In an example, the security device 106 may determine the given fingerprint by hashing and/or encrypting the given trusted connection information. Based at least in part on determining the given fingerprint and/or determining the identity of the given trusted source application, the security device 106 may store, as trusted information, a correlation between the identity of the given trusted source application and the given trusted fingerprint.

The security device 106 may likewise store, as trusted information, correlations between identities of the one or more trusted source applications and respective fingerprints. For example, the security device 106 may store, as trusted information, a first correlation between a first identity of a first trusted source application and a first fingerprint, a second correlation between a second identity of a second trusted source application and a second fingerprint, and so on. In some aspects, the security device 106 may store the trusted information in, for example, the security database 112 that is accessible to the security device 106.

While obtaining the cyber security services during an operation period, as shown by reference numeral 210, the user device 102 may utilize a current source application to transmit a current transmission packet to be transmitted via the firewall to a destination device on the open Internet. The current transmission packet may include an initial connection packet indicating current connection information to be utilized to connect with and/or communicate data with the current source application. The current connection information may include similar and/or analogous other connection information discussed elsewhere herein. For instance, the current connection information may indicate one or more parameters including a cipher suite, a compression method, an elliptic curve (EC), EC point format, a signature algorithm, a certificate timestamp, etc., as discussed elsewhere herein. In some aspects, it may be unknown whether the current source application is affected by malware.

Based at least in part on receiving the current transmission packet, as shown by reference numeral 220, the security device 106 may analyze the current transmission packet to determine an identity of the current source application. In an example, the security device 106 may determine, from the current transmission packet, source information (e.g., source IP address, source port, etc.) associated with the user device 102. The security device 106 may utilize the source information to query the local routing table and/or IP table to determine a process identifier associated with the current source application. Based at least in part on an association between the process identifier and the identity of the current source application, the security device 106 may determine the identity of the current source application.

Based at least in part on determining the identity of the current source application, the security device 106 may analyze the stored fingerprint information to determine an identity of a trusted source application that matches the identity of the current source application. In an example, the security device 106 may compare the identity of the current source application with identities of trusted source applications included in the stored fingerprint information. Further, the security device 106 may determine the stored fingerprint that is stored in correlation with the identity of the trusted source application that matches the identity of the current source application.

Additionally, based at least in part on determining the identity of the current source application, the security device 106 may determine current connection information. In some aspects, the current connection information may indicate information associated with one or more parameters to be used by the current source application and the destination application to connect and/or communicate with each other. As discussed elsewhere herein, the one or more parameters may include any combination of one or more of the cipher suite, the compression method, the elliptic curve (EC), the EC point format, the signature algorithm, the certificate timestamp, etc.

Based at least in part on determining the current connection information, the security device 106 may determine a current fingerprint associated with the current source application. In an example, the security device 106 may determine the current fingerprint by hashing and/or encrypting the current connection information.

As shown by reference numeral 230, the security device 106 may verify the identity of the current source application. In an example, the security device 106 may compare the current fingerprint with the stored fingerprint that is stored in correlation with the identity of the trusted source application that matches the identity of the current source application. Further, as shown by reference numeral 240, the security device 106 may process the current transmission packet based at least in part on a result of comparing the current fingerprint with the stored fingerprint.

When the security device 106 determines that the current fingerprint matches (e.g., is the same as) the stored fingerprint, the security device 106 may determine that the current source application is unaffected by malware. In this case, the security device 106 may route the current transmission packet to be transmitted via the firewall to the destination device on the open Internet.

Alternatively, when the security device 106 determines that the current fingerprint fails to match (e.g., is different from) the stored fingerprint, the security device 106 may determine that the current source application is affected by malware. In this case, the security device 106 may discard the current transmission packet to avoid the current transmission packet being transmitted via the firewall on the open Internet.

In this way, by conducting a verification process to verify an identity of a source application that transmits a transmission packet, and processing the transmission packet based at least in part on a result of the verification process, as discussed herein, a security device may prevent a malicious party from gaining unauthorized access to CSP control infrastructure. As a result, the security device may mitigate effects of private information becoming compromised and/or other hindrances. Additionally, the security device may enable efficient utilization of infrastructure resources (e.g., processing resources, memory resources, power consumption resources, battery life, or the like) and/or user device resources (e.g., processing resources, memory resources, power consumption resources, battery life, or the like) for suitable tasks associated with providing the cyber security services.

As indicated above, FIG. 2 is provided as an example. Other examples may differ from what is described with regard to FIG. 2.

FIG. 3 is an illustration of an example process 300 associated with verifying identity of a source of a transmission, according to various aspects of the present disclosure. In some aspects, the process 300 may be performed by a memory and/or a processor/controller (e.g., processing unit 110, processor 620) associated with a security device (e.g., security device 106). As shown by reference numeral 310, process 300 may include receiving, by a device from a transmitting source application, a transmission packet to be transmitted to a destination application. For instance, the security device may receive, from a transmitting source application, a transmission packet to be transmitted to a destination application, as discussed elsewhere herein.

As shown by reference numeral 320, process 300 may include determining, by the device, connection information included in the transmission packet, the connection information indicating one or more parameters to be utilized by the destination application to connect with the transmitting source application. For instance, the security device may utilize the associated memory and/or processor to determine connection information included in the transmission packet, the connection information indicating one or more parameters to be utilized by the destination application to connect with the transmitting source application, as discussed elsewhere herein.

As shown by reference numeral 330, process 300 may include determining, by the device, a fingerprint associated with the connection information based at least in part on encrypting the one or more parameters. For instance, the security device may utilize the associated memory and/or processor to determine a fingerprint associated with the connection information based at least in part on encrypting the one or more parameters, as discussed elsewhere herein.

As shown by reference numeral 340, process 300 may include comparing, by the device, the determined fingerprint with a stored fingerprint stored in correlation with an identity of a trusted source application. For instance, the security device may utilize the associated memory and/or processor to compare the determined fingerprint with a stored fingerprint stored in correlation with an identity of a trusted source application, as discussed elsewhere herein.

As shown by reference numeral 350, process 300 may include processing, by the device, the transmission packet based at least in part on a result of comparing the determined fingerprint with the stored fingerprint. For instance, the security device may utilize the associated memory and/or processor to process the transmission packet based at least in part on a result of comparing the determined fingerprint with the stored fingerprint, as discussed elsewhere herein.

Process 300 may include additional aspects, such as any single aspect or any combination of aspects described below and/or in connection with one or more other processes described elsewhere herein.

In a first aspect, in process 300, the identity of the trusted source application matches an identity of the transmitting source application.

In a second aspect, alone or in combination with the first aspect, in process 300, processing the transmission packet includes forwarding the transmission packet for transmission to the destination application when the result indicates that the determined fingerprint matches the stored fingerprint.

In a third aspect, alone or in combination with the first through second aspects, in process 300, processing the transmission packet includes discarding the transmission packet when the result indicates that the determined fingerprint fails to match the stored fingerprint.

In a fourth aspect, alone or in combination with the first through third aspects, in process 300, processing the transmission packet includes forwarding the transmission packet for transmission to the destination application based at least in part on determining that the transmitting source application is unaffected by malware.

In a fifth aspect, alone or in combination with the first through fourth aspects, in process 300, processing the transmission packet includes discarding the transmission packet based at least in part on determining that the transmitting source application is affected by malware.

In a sixth aspect, alone or in combination with the first through fifth aspects, process 300 may include determining an identity of the transmitting source application based at least in part on determining a process identifier from information included in the transmission packet, the process identifier being associated with the identity of the transmitting source application.

Although FIG. 3 shows example blocks of the process, in some aspects, the process may include additional blocks, fewer blocks, different blocks, or differently arranged blocks than those depicted in FIG. 3. Additionally, or alternatively, two or more of the blocks of the process may be performed in parallel.

As indicated above, FIG. 3 is provided as an example. Other examples may differ from what is described with regard to FIG. 3.

FIG. 4 is an illustration of an example process 400 associated with verifying identity of a source of a transmission, according to various aspects of the present disclosure. In some aspects, the process 400 may be performed by a memory and/or a processor/controller (e.g., processing unit 110, processor 620) associated with a security device (e.g., security device 106). As shown by reference numeral 410, process 400 may include storing, by a device in a database, a trusted fingerprint determined based at least in part on encrypting trusted connection information included in a trusted transmission packet received from a trusted source application. For instance, the security device may store, in a database, a trusted fingerprint determined based at least in part on encrypting trusted connection information included in a trusted transmission packet received from a trusted source application, as discussed elsewhere herein.

As shown by reference numeral 420, process 400 may include determining, by the device, a current fingerprint based at least in part on encrypting current connection information included in a current transmission packet received from a current source application. For instance, the security device may utilize the associated memory and/or processor to determine a current fingerprint based at least in part on encrypting current connection information included in a current transmission packet received from a current source application, as discussed elsewhere herein.

As shown by reference numeral 430, process 400 may include comparing, by the device, the current fingerprint with the trusted fingerprint. For instance, the security device may utilize the associated memory and/or processor to compare the current fingerprint with the trusted fingerprint, as discussed elsewhere herein.

As shown by reference numeral 440, process 400 may include processing, by the device, the current transmission packet based at least in part on a result of comparing the current fingerprint with the trusted fingerprint. For instance, the security device may utilize the associated memory and/or processor to process the current transmission packet based at least in part on a result of comparing the current fingerprint with the trusted fingerprint, as discussed elsewhere herein.

Process 400 may include additional aspects, such as any single aspect or any combination of aspects described below and/or in connection with one or more other processes described elsewhere herein.

In a first aspect, in process 400, storing the trusted fingerprint includes storing the trusted fingerprint in correlation with an identity of the trusted source application.

In a second aspect, alone or in combination with the first aspect, in process 400, the trusted connection information indicates one or more trusted connection parameters to be utilized for connecting with the trusted source application, or the current connection information indicates one or more current connection parameters to be utilized for connecting with the current source application.

In a third aspect, alone or in combination with the first through second aspects, in process 400, encrypting the trusted connection information includes encrypting information associated with one or more trusted connection parameters to be utilized for connecting with the trusted source application, or encrypting the current connection information includes encrypting information associated with one or more current connection parameters to be utilized for connecting with the current source application.

In a fourth aspect, alone or in combination with the first through third aspects, in process 400, processing the current transmission packet includes forwarding the current transmission packet for transmission when the result indicates that the current fingerprint matches the trusted fingerprint.

In a fifth aspect, alone or in combination with the first through fourth aspects, in process 400, processing the current transmission packet includes discarding the current transmission packet when the result indicates that the current fingerprint fails to match the trusted fingerprint.

In a sixth aspect, alone or in combination with the first through fifth aspects, process 400 may include determining whether the current source application is affected by malware based at least in part on the result of comparing the current fingerprint with the trusted fingerprint.

Although FIG. 4 shows example blocks of the process, in some aspects, the process may include additional blocks, fewer blocks, different blocks, or differently arranged blocks than those depicted in FIG. 4. Additionally, or alternatively, two or more of the blocks of the process may be performed in parallel.

As indicated above, FIG. 4 is provided as an example. Other examples may differ from what is described with regard to FIG. 4.

FIG. 5 is an illustration of an example process 500 associated with verifying identity of a source of a transmission, according to various aspects of the present disclosure. In some aspects, the process 500 may be performed by a memory and/or a processor/controller (e.g., processing unit 110, processor 620) associated with a CSP control infrastructure (e.g., CSP control infrastructure 104) to configure a security device. As shown by reference numeral 510, process 500 may include configuring a security device to store, in a database, a trusted fingerprint determined based at least in part on encrypting trusted connection information included in a trusted transmission packet received from a trusted source application. For instance, an infrastructure device may utilize the associated memory and/or processor to configure a security device to store, in a database, a trusted fingerprint determined based at least in part on encrypting trusted connection information included in a trusted transmission packet received from a trusted source application, as discussed elsewhere herein.

As shown by reference numeral 520, process 500 may include configuring the security device to determine a current fingerprint based at least in part on encrypting current connection information included in a current transmission packet received from a current source application. For instance, the infrastructure device may utilize the associated memory and/or processor to configure the security device to determine a current fingerprint based at least in part on encrypting current connection information included in a current transmission packet received from a current source application, as discussed elsewhere herein.

As shown by reference numeral 530, process 500 may include configuring the security device to compare the current fingerprint with the trusted fingerprint. For instance, the infrastructure device may utilize the associated memory and/or processor to configure the security device to compare the current fingerprint with the trusted fingerprint, as discussed elsewhere herein.

As shown by reference numeral 540, process 500 may include configuring the security device to process the current transmission packet based at least in part on a result of comparing the current fingerprint with the trusted fingerprint. For instance, the infrastructure device may utilize the associated memory and/or processor to configure the security device to process the current transmission packet based at least in part on a result of comparing the current fingerprint with the trusted fingerprint, as discussed elsewhere herein.

Process 500 may include additional aspects, such as any single aspect or any combination of aspects described below and/or in connection with one or more other processes described elsewhere herein.

In a first aspect, in process 500, configuring the security device to store the trusted fingerprint includes configuring the security device to store the trusted fingerprint in correlation with an identity of the trusted source application.

In a second aspect, alone or in combination with the first aspect, in process 500, the trusted connection information indicates one or more trusted connection parameters to be utilized for connecting with the trusted source application, or the current connection information indicates one or more current connection parameters to be utilized for connecting with the current source application.

In a third aspect, alone or in combination with the first through second aspects, in process 500, encrypting the trusted connection information includes encrypting information associated with one or more trusted connection parameters to be utilized for connecting with the trusted source application, or encrypting the current connection information includes encrypting information associated with one or more current connection parameters to be utilized for connecting with the current source application.

In a fourth aspect, alone or in combination with the first through third aspects, in process 500, configuring the security device to process the current transmission packet includes configuring the security device to forward the current transmission packet for transmission when the result indicates that the current fingerprint matches the trusted fingerprint.

In a fifth aspect, alone or in combination with the first through fourth aspects, in process 500, configuring the security device to process the current transmission packet includes configuring the security device to discard the current transmission packet when the result indicates that the current fingerprint fails to match the trusted fingerprint.

In a sixth aspect, alone or in combination with the first through fifth aspects, process 500 may include configuring the security device to determine whether the current source application is affected by malware based at least in part on the result of comparing the current fingerprint with the trusted fingerprint.

Although FIG. 5 shows example blocks of the process, in some aspects, the process may include additional blocks, fewer blocks, different blocks, or differently arranged blocks than those depicted in FIG. 5. Additionally, or alternatively, two or more of the blocks of the process may be performed in parallel.

As indicated above, FIG. 5 is provided as an example. Other examples may differ from what is described with regard to FIG. 5.

FIG. 6 is an illustration of example devices 600 associated with verifying identity of a source of a transmission, according to various aspects of the present disclosure. In some aspects, the example devices 600 may form part of or implement the systems, servers, environments, infrastructures, components, devices, or the like described elsewhere herein (e.g., CSP control infrastructure, VPN server, etc.) and may be used to perform example processes described elsewhere herein. The example devices 600 may include a universal bus 610 communicatively coupling a processor 620, a memory 630, a storage component 640, an input component 650, an output component 660, and a communication interface 670.

Bus 610 may include a component that permits communication among multiple components of a device 600. Processor 620 may be implemented in hardware, firmware, and/or a combination of hardware and software. Processor 620 may take the form of a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some aspects, processor 620 may include one or more processors capable of being programmed to perform a function. Memory 630 may include a random access memory (RAM), a read only memory (ROM), and/or another type of dynamic or static storage device (e.g., a flash memory, a magnetic memory, and/or an optical memory) that stores information and/or instructions for use by processor 620.

Storage component 640 may store information and/or software related to the operation and use of a device 600. For example, storage component 640 may include a hard disk (e.g., a magnetic disk, an optical disk, and/or a magneto-optic disk), a solid state drive (SSD), a compact disc (CD), a digital versatile disc (DVD), a floppy disk, a cartridge, a magnetic tape, and/or another type of non-transitory computer-readable medium, along with a corresponding drive.

Input component 650 may include a component that permits a device 600 to receive information, such as via user input (e.g., a touch screen display, a keyboard, a keypad, a mouse, a button, a switch, and/or a microphone). Additionally, or alternatively, input component 650 may include a component for determining location (e.g., a global positioning system (GPS) component) and/or a sensor (e.g., an accelerometer, a gyroscope, an actuator, another type of positional or environmental sensor, and/or the like). Output component 660 may include a component that provides output information from device 600 (via, for example, a display, a speaker, a haptic feedback component, an audio or visual indicator, and/or the like).

Communication interface 670 may include a transceiver-like component (e.g., a transceiver, a separate receiver, a separate transmitter, and/or the like) that enables a device 600 to communicate with other devices, such as via a wired connection, a wireless connection, or a combination of wired and wireless connections. Communication interface 670 may permit device 600 to receive information from another device and/or provide information to another device. For example, communication interface 670 may include an Ethernet interface, an optical interface, a coaxial interface, an infrared interface, a radio frequency (RF) interface, a universal serial bus (USB) interface, a Wi-Fi interface, a cellular network interface, and/or the like.

A device 600 may perform one or more processes described elsewhere herein. A device 600 may perform these processes based on processor 620 executing software instructions stored by a non-transitory computer-readable medium, such as memory 630 and/or storage component 640. As used herein, the term "computer-readable medium" may refer to a non-transitory memory device. A memory device may include memory space within a single physical storage device or memory space spread across multiple physical storage devices.

Software instructions may be read into memory 630 and/or storage component 640 from another computer-readable medium or from another device via communication interface 670. When executed, software instructions stored in memory 630 and/or storage component 640 may cause processor 620 to perform one or more processes described elsewhere herein. Additionally, or alternatively, hardware circuitry may be used in place of or in combination with software instructions to perform one or more processes described elsewhere herein. Thus, implementations described herein are not limited to any specific combination of hardware circuitry and software.

The quantity and arrangement of components shown in FIG. 6 are provided as an example. In practice, a device 600 may include additional components, fewer components, different components, or differently arranged components than those shown in FIG. 6. Additionally, or alternatively, a set of components (e.g., one or more components) of a device 600 may perform one or more functions described as being performed by another set of components of a device 600.

As indicated above, FIG. 6 is provided as an example. Other examples may differ from what is described with regard to FIG. 6.

Persons of ordinary skill in the art will appreciate that the aspects encompassed by the present disclosure are not limited to the particular exemplary aspects described herein. In that regard, although illustrative aspects have been shown and described, a wide range of modification, change, and substitution is contemplated in the foregoing disclosure. It is understood that such variations may be made to the aspects without departing from the scope of the present disclosure. Accordingly, it is appropriate that the appended claims be construed broadly and in a manner consistent with the present disclosure.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" or "device" is intended to be broadly construed as hardware, firmware, or a combination of hardware and software. As used herein, a processor is implemented in hardware, firmware, or a combination of hardware and software.

As used herein, satisfying a threshold may, depending on the context, refer to a value being greater than the threshold, greater than or equal to the threshold, less than the threshold, less than or equal to the threshold, equal to the threshold, or not equal to the threshold, among other examples, or combinations thereof.

It will be apparent that systems or methods described herein may be implemented in different forms of hardware, firmware, or a combination of hardware and software. The actual specialized control hardware or software code used to implement these systems or methods is not limiting of the aspects. Thus, the operation and behavior of the systems or methods were described herein without reference to specific software code—it being understood that software and hardware can be designed to implement the systems or methods based, at least in part, on the description herein.

Even though particular combinations of features are recited in the claims or disclosed in the specification, these combinations are not intended to limit the disclosure of various aspects. In fact, many of these features may be combined in ways not specifically recited in the claims or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (for example, a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:
   storing, by a device in a database during a reference period, a trusted fingerprint determined based at least in part on encrypting trusted connection information included in a trusted transmission packet received from a trusted source application, the trusted connection information including information to be utilized for connecting with the trusted source application, which is known to be unaffected by malware;
   determining, by the device during an operation period, a current fingerprint based at least in part on encrypting current connection information included in a current transmission packet received from a current source application, the current connection information including information to be utilized for connecting with the current source application;
   comparing, by the device, the current fingerprint with the trusted fingerprint; and
   processing, by the device, the current transmission packet based at least in part on a result of comparing the current fingerprint with the trusted fingerprint.

2. The method of claim 1, wherein storing the trusted fingerprint includes storing the trusted fingerprint in correlation with an identity of the trusted source application.

3. The method of claim 1, wherein
   the trusted connection information indicates one or more trusted connection parameters to be utilized for connecting with the trusted source application, or
   the current connection information indicates one or more current connection parameters to be utilized for connecting with the current source application.

4. The method of claim 1, wherein
   encrypting the trusted connection information includes encrypting information associated with one or more trusted connection parameters to be utilized for connecting with the trusted source application, or
   encrypting the current connection information includes encrypting information associated with one or more current connection parameters to be utilized for connecting with the current source application.

5. The method of claim 1, wherein processing the current transmission packet includes forwarding the current transmission packet for transmission when the result indicates that the current fingerprint matches the trusted fingerprint.

6. The method of claim 1, wherein processing the current transmission packet includes discarding the current transmission packet when the result indicates that the current fingerprint fails to match the trusted fingerprint.

7. The method of claim 1, further comprising:
determining whether the current source application is affected by malware based at least in part on the result of comparing the current fingerprint with the trusted fingerprint.

8. A device, comprising:
a memory; and
a processor communicatively coupled to the memory, the memory and the processor being configured to:
store, in a database during a reference period, a trusted fingerprint determined based at least in part on encrypting trusted connection information included in a trusted transmission packet received from a trusted source application, the trusted connection information including information to be utilized for connecting with the trusted source application, which is known to be unaffected by malware;
determine, during an operation period, a current fingerprint based at least in part on encrypting current connection information included in a current transmission packet received from a current source application, the current connection information including information to be utilized for connecting with the current source application;
compare the current fingerprint with the trusted fingerprint; and
process the current transmission packet based at least in part on a result of comparing the current fingerprint with the trusted fingerprint.

9. The device of claim 8, wherein, to store the trusted fingerprint, the memory and the processor are configured to store the trusted fingerprint in correlation with an identity of the trusted source application.

10. The device of claim 8, wherein
the trusted connection information indicates one or more trusted connection parameters to be utilized for connecting with the trusted source application, or
the current connection information indicates one or more current connection parameters to be utilized for connecting with the current source application.

11. The device of claim 8, wherein
to encrypt the trusted connection information, the memory and the processor are configured to encrypt information associated with one or more trusted connection parameters to be utilized for connecting with the trusted source application, or
to encrypt the current connection information, the memory and the processor are configured to encrypt information associated with one or more current connection parameters to be utilized for connecting with the current source application.

12. The device of claim 8, wherein, to process the current transmission packet, the memory and the processor are configured to forward the current transmission packet for transmission when the result indicates that the current fingerprint matches the trusted fingerprint.

13. The device of claim 8, wherein, to process the current transmission packet, the memory and the processor are configured to discard the current transmission packet when the result indicates that the current fingerprint fails to match the trusted fingerprint.

14. The device of claim 8, wherein the memory and the processor are configured to:
determine whether the current source application is affected by malware based at least in part on the result of comparing the current fingerprint with the trusted fingerprint.

15. A non-transitory computer-readable medium configured to store instructions, which when executed by a processor associated with a device, cause the processor to:
store, in a database during a reference period, a trusted fingerprint determined based at least in part on encrypting trusted connection information included in a trusted transmission packet received from a trusted source application, the trusted connection information including information to be utilized for connecting with the trusted source application, which is known to be unaffected by malware;
determine, during an operation period, a current fingerprint based at least in part on encrypting current connection information included in a current transmission packet received from a current source application, the current connection information including information to be utilized for connecting with the current source application;
compare the current fingerprint with the trusted fingerprint; and
process the current transmission packet based at least in part on a result of comparing the current fingerprint with the trusted fingerprint.

16. The non-transitory computer-readable medium of claim 15, wherein, to store the trusted fingerprint, the processor is configured to store the trusted fingerprint in correlation with an identity of the trusted source application.

17. The non-transitory computer-readable medium of claim 15, wherein
the trusted connection information indicates one or more trusted connection parameters to be utilized for connecting with the trusted source application, or
the current connection information indicates one or more current connection parameters to be utilized for connecting with the current source application.

18. The non-transitory computer-readable medium of claim 15, wherein
to encrypt the trusted connection information, the processor is configured to encrypt information associated with one or more trusted connection parameters to be utilized for connecting with the trusted source application, or
to encrypt the current connection information, the processor is configured to encrypt information associated with one or more current connection parameters to be utilized for connecting with the current source application.

19. The non-transitory computer-readable medium of claim 15, wherein, to process the current transmission packet, the processor is configured to forward the current transmission packet for transmission when the result indicates that the current fingerprint matches the trusted fingerprint.

20. The non-transitory computer-readable medium of claim 15, wherein, to process the current transmission packet, the processor is configured to discard the current transmission packet when the result indicates that the current fingerprint fails to match the trusted fingerprint.

* * * * *